US011429582B2

(12) United States Patent
Walters et al.

(10) Patent No.: US 11,429,582 B2
(45) Date of Patent: Aug. 30, 2022

(54) TECHNIQUES FOR CREATING AND UTILIZING MULTIDIMENSIONAL EMBEDDING SPACES

(71) Applicant: Capital One Services, LLC, McLean, VA (US)

(72) Inventors: Austin Grant Walters, Savoy, IL (US);
Mark Louis Watson, Sedona, AZ (US);
Jeremy Edward Goodsitt, Champaign, IL (US); Anh Truong, Champaign, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 142 days.

(21) Appl. No.: 16/844,541

(22) Filed: Apr. 9, 2020

(65) Prior Publication Data

US 2021/0319004 A1    Oct. 14, 2021

(51) Int. Cl.
*G06F 16/22*    (2019.01)
*G06F 16/28*    (2019.01)
*G06N 20/00*    (2019.01)

(52) U.S. Cl.
CPC ...... *G06F 16/2264* (2019.01); *G06F 16/2237* (2019.01); *G06F 16/285* (2019.01); *G06N 20/00* (2019.01)

(58) Field of Classification Search
CPC ............. G06F 16/2264; G06F 16/2237; G06F 16/285; G06F 40/30; G06F 16/3347; G06N 20/00; G06N 3/08
USPC ....................................................... 707/791
See application file for complete search history.

(56) References Cited

U.S. PATENT DOCUMENTS

| 10,607,042 | B1* | 3/2020 | Dasgupta | ................ | G06F 40/30 |
| 10,705,796 | B1* | 7/2020 | Doyle | ....................... | G06F 7/08 |
| 2020/0012933 | A1 | 1/2020 | Truong et al. | | |
| 2020/0125575 | A1* | 4/2020 | Ghoshal | ................... | G06K 9/46 |

OTHER PUBLICATIONS

Author Unknown, "Word Embeddings", Tensorflow [online]. Retrieved from Internet URL: <https://www.tensorflow.org/tutorials/text/word_embeddings>. Retrieved on Apr. 7, 2020, 18 pages.

* cited by examiner

*Primary Examiner* — Evan Aspinwall
(74) *Attorney, Agent, or Firm* — KDB

(57) ABSTRACT

Various embodiments are generally directed to techniques for creating and utilizing multidimensional embedding spaces for data objects, such as to condition the data for input to a neural network, for instance. Some embodiments are particularly directed to converting semi-structured data, such as a set of data objects, into object vector sets mapped to a multidimensional embedding space. In many embodiments, an embedding space for a set of data objects may be customized with a set of dimensions that correspond to various characteristics of the set of data objects. These and other embodiments are described and claimed.

20 Claims, 9 Drawing Sheets

Identify a set of data objects, each data object in the set of data objects comprising a key and an object value, wherein each object value comprises value data or an embedded object
530

↓

Analyze the set of data objects to determine one or more data characteristics of the set of data objects
532

↓

Determine one or more embedding space parameters based on the one or more data characteristics of the set of data objects, wherein the one or more embedding space parameters define an embedding space comprising a plurality of dimensions including a key dimension
534

↓

Identify a first data object in the set of data objects, the first data object comprising a first key and a first object value
536

↓

Generate a first object vector for the first data object in the set of data objects based on the first key, the first object value, and the one or more embedding space parameters, the first object vector including a first set of dimension values and each dimension value in the set of dimension values corresponds to one of the plurality of dimensions in the embedding space, wherein the first set of dimension values includes a first key dimension value that maps onto the key dimension, the first key dimension value determined based on the first key of the first data object
538

↓

Provide the first object vector as input to a machine learning algorithm
540

↓

Determine a classification of the first data object based on output of the machine learning algorithm in response to input of the first object vector
542

FIG. 5C
500C

Identifying a set of data objects, each data object in the set of data objects comprising a key and an object value, wherein each object value comprises value data or an embedded object
530

Analyzing the set of data objects to determine one or more data characteristics of the set of data objects
532

Determining one or more embedding space parameters based on the one or more data characteristics of the set of data objects, wherein the one or more embedding space parameters define an embedding space comprising a plurality of dimensions including a key dimension
534

Identifying a first data object in the set of data objects, the first data object comprising a first key and a first object value
536

Generating a first object vector for the first data object in the set of data objects based on the first key, the first object value, and the embedding space parameters, wherein the first object vector includes a set of dimension values and each dimension value in the set of dimension values corresponds to one of the plurality of dimensions in the embedding space
538

Providing the first object vector as input to a machine learning algorithm
540

Determining a classification of the first data object based on output of the machine learning algorithm in response to input of the first object vector
542

700

TECHNIQUES FOR CREATING AND UTILIZING MULTIDIMENSIONAL EMBEDDING SPACES

BACKGROUND

Typically, a data file refers to a computer file which stores data to be used by a computer application or system. The data within the computer file can include further divisions or groupings. For example, a data file may include a set of samples or a set of data objects. A data object can refer to a region of storage (e.g., a portion of a data file) that contains one or more values, such as group of values and/or one or more hierarchies of grouped values. An embedding space, on the other hand, can be used to map a discrete variable to a vector of continuous numbers.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and memory comprising instructions that when executed by the processor cause the processor to perform operations comprising one or more of: identify a set of data objects, each data object in the set of data objects comprising a key and an object value, wherein each object value comprises value data or an embedded object; analyze the set of data objects to determine one or more data characteristics of the set of data objects; determine one or more embedding space parameters based on the one or more data characteristics of the set of data objects, wherein the one or more embedding space parameters define an embedding space comprising a plurality of dimensions; generate a set of object vectors, the set of object vectors comprising an object vector for each data object in the set of data objects, each object vector in the set of object vectors to include a set of dimension values and each dimension value in the set of dimension values to correspond to one of the plurality of dimensions in the embedding space, wherein a respective object vector for a respective data object is generated based on a respective key of the respective data object, a respective object value of the respective data object, and the one or more embedding space parameters; provide the set of object vectors as input to a machine learning algorithm; and determine a classification of each data object in the set of data objects based on output of the machine learning algorithm in response to input of the set of object vectors. In various embodiments, the set of data objects may comprise a first data object including a first key and a first object value, the plurality of dimensions may include a key dimension, and the memory may comprise instructions that when executed by the processor cause the processor to determine a first key dimension value for the first data object based on the first key, wherein the first key dimension value maps onto the key dimension. In some embodiments, the plurality of dimensions that define the embedding space may comprise three or more of a key dimension, an object value dimension, a key distribution dimension, an object value distribution dimension, an object depth dimension, a variance dimension, a minimum object value dimension, and a maximum object value dimension. In many embodiments, the set of data objects may comprise a first data object including a first object value, the first object value may comprise a first embedded data object including a first embedded object value, and the first embedded object value may comprise a second embedded data object including a second embedded object value. In many such embodiments, the plurality of dimensions that define the embedding space may comprise an object depth dimension, the second embedded object value may comprise embedded value data, and the memory may comprise instruction that when executed by the processor cause the processor to determine an object depth dimension value for the first data object as three. In several embodiments, the plurality of dimensions that define the embedding space may comprise a variance dimension and the memory may comprise instructions that when executed by the processor cause the processor to compute a variance value for each data object in the set of data objects, wherein the variance value for each data object in the set of data objects maps onto the variance dimension. In various embodiments, the set of data objects may comprise a set of JavaScript Object Notation (JSON) objects. In various such embodiments, at least one data object in the set of data objects may comprise an embedded JSON object.

One or more embodiments described herein may include at least one non-transitory computer-readable medium comprising a set of instructions that, in response to being executed by a processor circuit, cause the processor circuit to perform operations comprising one or more of: identify a set of data objects, each data object in the set of data objects comprising a key and an object value, wherein each object value comprises value data or an embedded object; analyze the set of data objects to determine one or more data characteristics of the set of data objects; determine one or more embedding space parameters based on the one or more data characteristics of the set of data objects, wherein the one or more embedding space parameters define an embedding space comprising a plurality of dimensions, the plurality of dimensions including a key dimension; identify a first data object in the set of data objects, the first data object comprising a first key and a first object value; generate a first object vector for the first data object in the set of data objects based on the first key, the first object value, and the one or more embedding space parameters, the first object vector including a first set of dimension values and each dimension value in the set of dimension values corresponds to one of the plurality of dimensions in the embedding space, wherein the first set of dimension values includes a first key dimension value that maps onto the key dimension, the first key dimension value determined based on the first key of the first data object; provide the first object vector as input to a machine learning algorithm; and determine a classification of the first data object based on output of the machine learning algorithm in response to input of the first object vector. In various embodiments, the plurality of dimensions that define the embedding space may comprise three or more of a key dimension, an object value dimension, a key distribution dimension, an object value distribution dimension, an object depth dimension, a variance dimension, a minimum object value dimension, and a maximum object value dimension. In some embodiments, the set of data objects may comprise a second data object including a second object value, the second object value may comprise a first embedded data object including a first embedded object value, and the first embedded object value may comprise a second embedded data object including a second embedded object value. In some such embodiments, the plurality of dimensions that define the embedding space may comprise an object depth dimension, the second embedded object value may comprise embedded value data, and the instructions may, in response to being executed by the processor circuit, cause the processor circuit to determine an object depth dimension value for the second data object as three. In many embodiments, the plurality of dimensions that define the embedding space may comprise a variance dimension and the instructions may, in response to being executed by the processor circuit, cause the processor circuit to compute a variance value for each data object in the set of data objects, wherein the variance value for each data object in the set of data objects maps onto the variance dimension. In several embodiments, the set of data objects may comprise a set of JavaScript Object Notation (JSON) objects. In several such embodiments, at least one data object in the set of data objects may comprise an embedded JSON object.

Several embodiments described herein may include a computer-implemented method, comprising one or more of: identifying a set of data objects, each data object in the set of data objects comprising a key and an object value, wherein each object value comprises value data or an embedded object; analyzing the set of data objects to determine one or more data characteristics of the set of data objects; determining one or more embedding space parameters based on the one or more data characteristics of the set of data objects, wherein the one or more embedding space parameters define an embedding space comprising a plurality of dimensions; identifying a first data object in the set of data objects, the first data object comprising a first key and a first object value; generating a first object vector for the first data object in the set of data objects based on the first key, the first object value, and the embedding space parameters, wherein the first object vector includes a set of dimension values and each dimension value in the set of dimension values corresponds to one of the plurality of dimensions in the embedding space; providing the first object vector as input to a machine learning algorithm; and determining a classification of the first data object based on output of the machine learning algorithm in response to input of the first object vector. In various embodiments, the plurality of dimensions may include a key dimension. Various such embodiments may comprise determining a first key dimension value for the first data object based on the first key, wherein the first key dimension value maps onto the key dimension. In some embodiments, the plurality of dimensions that define the embedding space may comprise three or more of a key dimension, an object value dimension, a key distribution dimension, an object value distribution dimension, an object depth dimension, a variance dimension, a minimum object value dimension, and a maximum object value dimension. In many embodiments, the set of data objects may comprise a second data object including a second object value, the second object value may comprise a first embedded data object including a first embedded object value, and the first embedded object value may comprise a second embedded data object including a second embedded object value. In many such embodiments, the plurality of dimensions that define the embedding space may comprise an object depth dimension and the second embedded object value may comprise embedded value data. Further such embodiments may comprise determining an object depth dimension value for the second data object as three.

BRIEF DESCRIPTION OF THE DRAWINGS

FIGS. 5A-5C illustrate exemplary logic flows according to one or more embodiments described here.

DETAILED DESCRIPTION

Figure 1:
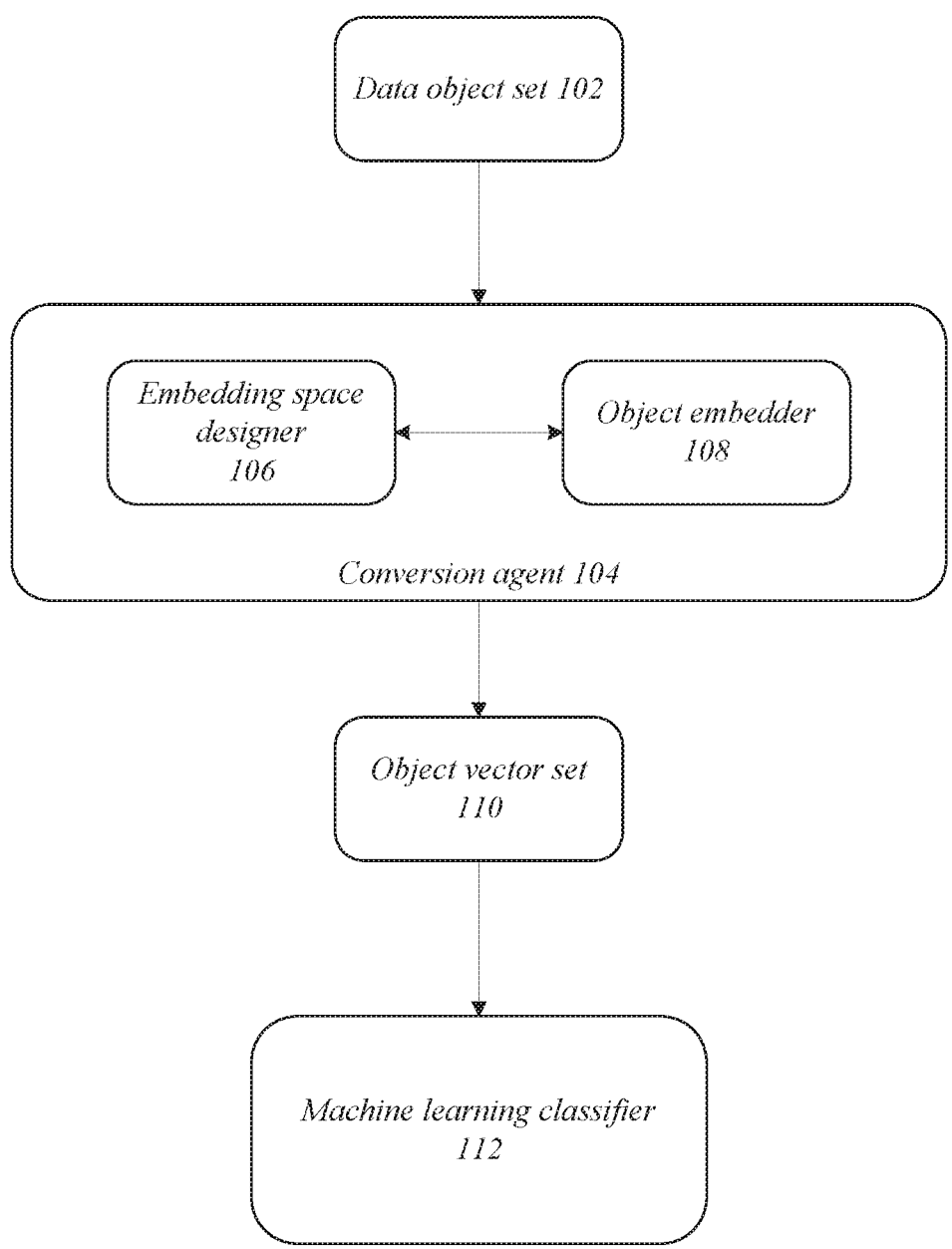
FIG. 1 illustrates an exemplary operating environment according to one or more embodiments described herein.

Various embodiments are generally directed to techniques for creating and utilizing multidimensional embedding spaces for data objects, such as to condition the data for input to a neural network, for instance. Some embodiments are particularly directed to converting semi-structured data, such as a set of data objects, into object vector sets mapped to a multidimensional embedding space. In many embodiments, an embedding space for a set of data objects may be customized with a set of dimensions that correspond to various characteristics of the set of data objects. These and other embodiments are described and claimed.

Some challenges facing data objects include classifying, correlating, and/or profiling them, such as with respect to other data objects. For instance, vast quantities of data objects may be generated as part of enterprise operations. However, oftentimes, the data objects are never correlated with other data objects or require extensive manual analysis to correlate them with other data objects. Further, machine learning techniques function poorly on sets of data objects provided as input. Adding further complexity, data objects are not adapted for mapping to embedding spaces. These and other factors may result in lost efficiencies and underutilization of data objects, resulting in data objects with reduced applicability and poor adaptability. Such limitations can drastically reduce the usability data objects, contributing to lost economies of scale, excessive data waste, and inefficient systems, devices, and techniques.

Various embodiments described herein include a conversion agent to create and utilize multidimensional embedding spaces customized for data objects, such as to condition data for input to a neural network. Some embodiments are particularly directed to efficiently and effectively converting semi-structured data, such as a set of data objects, into object vector sets mapped to a multidimensional embedding space customized for the set of data objects. In many embodiments, an embedding space for a set of data objects may include a customizable a set of dimensions. In many such embodiments, each dimension may correspond to a unique characteristic, or indication thereof, of the set of data objects. One or more embodiments described herein may utilize the multidimensional embedding spaces to create an object vector set created from the set of data objects. In several embodiments, the conversion agent may map data objects into a multidimensional embedding space to facilitate classification of and/or correlation between data objects. In some embodiments, embedding data objects, such as JavaScript Object Notation (JSON) objects, may reduce sparsity when converting to a column-wise format and/or reduce storage required for repeated keys, such as ones appearing in many rows. Several embodiments include a machine learning classifier that is able to classify, produce, and/or correlate data in a data object with data in other data objects more accurately by using multidimensional embedding spaces. One or more of these components and/or techniques may be used as part of a process to automatically classify, correlate, and/or profile data objects to increase usability of data objects, resulting in more efficient and increased data utilization.

One or more techniques described herein may facilitate accurate characterization of data by providing embedding spaces with customized dimensions, leading to useful and previously unknown relationships between data objects being identified. In these and other ways, components/techniques described here may identify methods to increase efficiency, decrease performance costs, decrease computational cost, and/or reduce resource requirements to correlate data objects in an accurate, reactive, efficient, dynamic, and scalable manner, resulting in several technical effects and advantages over conventional computer technology, including increased capabilities and improved adaptability. In various embodiments, one or more of the aspects, techniques, and/or components described herein may be implemented in a practical application via one or more computing devices, and thereby provide additional and useful functionality to the one or more computing devices, resulting in more capable, better functioning, and improved computing devices. Further, one or more of the aspects, techniques, and/or components described herein may be utilized to improve the technical fields of data management, embedding spaces, data analysis, and/or machine learning.

In several embodiments, components described herein may provide specific and particular manners of to enable identification of relationships between data objects to optimize utilization of the data objects. In several such embodiments, the specific and particular manners of enabling identification of relationships between data objects may include one or more of embedding data objects in multidimensional frames, training and/or using an encoder to generate latent space representations of data objects based on the multidimensional frames and using the latent space representations to classify the data objects.

In many embodiments, one or more of the components described herein may be implemented as a set of rules that improve computer-related technology by allowing a function not previously performable by a computer that enables an improved technological result to be achieved. For example, the function allowed may include one or more of: identifying a set of data objects, each data object in the set of data objects comprising a key and an object value, wherein each object value comprises value data or an embedded object; analyzing the set of data objects to determine one or more data characteristics of the set of data objects; determining one or more embedding space parameters based on the one or more data characteristics of the set of data objects, wherein the one or more embedding space parameters define an embedding space comprising a plurality of dimensions; identifying a first data object in the set of data objects, the first data object comprising a first key and a first object value; generating a first object vector for the first data object in the set of data objects based on the first key, the first object value, and the embedding space parameters, wherein the first object vector includes a set of dimension values and each dimension value in the set of dimension values corresponds to one of the plurality of dimensions in the embedding space; providing the first object vector as input to a machine learning algorithm; and determining a classification of the first data object based on output of the machine learning algorithm in response to input of the first object vector.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary operating environment 100 according to one or more embodiments described herein. Operating environment 100 may include a set of one or more data objects 102, a conversion agent 104 with an embedding space designer 106 and an object embedder 108, an object vector set 110, and a machine learning classifier 112. In many embodiments described herein, the embedding space designer 106 may create a customized embedding space for data object set 102. In many such embodiments, object embedder 108 may utilize the customized embedding space to convert the data object set 102 into object vector set 110. In some embodiments, the object vector set 110 may be provided to the machine learning classifier 112 as input. Embodiments are not limited in this context.

In many embodiments, embedding space designer 106 may analyze the data object set 102 to determine a set of embedding space parameters. In many such embodiments, the object embedder 108 may utilize the embedding space parameters to determine the object vector set 110 based on the data object set 102. In several embodiments, the object vector set 110 may be provided as input to machine learning classifier 112. For example, the object vector set 110 may be utilized to train a neural network and/or the object vector set 110 may be classified by a machine learning algorithm. In some embodiments, an object vector set may be used to produce synthetic data. For instance, a machine learning algorithm may produce a synthetic set of data that has different content (e.g., different data values) than an original set of data, however, the synthetic set of data may share the same data correlations as the original set of data.

The data object set 102 may include key-value stores and/or JSON objects. In several embodiments, data objects may include one or more embedded data objects and/or layers thereof. In various embodiments, conversion agent 104 may map data objects onto an object vector set 110 comprising a vector of real numbers. Further, in some embodiments, a vector may represent a point in an n-dimensional space defined by the embedding space parameters. In many embodiments, the conversion agent 104 may structure data objects for embedding.

For example, a set of data objects (e.g., JSON objects) may have the form: {key: value, key: {key: value}, key: value}. In such examples, various embodiments herein may convert the set of data objects to a multidimensional embedding space. Further, the multidimensional embedding space may be customized based on the set of data objects. In many embodiments, the embedding space may include dimensions corresponding to one or more of a set of possible keys, a distribution of each value for a give key (e.g., normalized to between 0 to 1 or −1 to 1), depth of the data object (e.g., number of layers or embedded objects, such as internal sub-JSON objects), variance for key-values, data type for key-values, minimum for key-values, maximum for key-values, and the like. In some embodiments, the embedding space may include over a thousand dimensions.

In various embodiments, the key and/or the value may be part of the embedding. Accordingly, in many embodiments, key-values are embedded. In some embodiment, the input may be constructed such that the input vector represents all the keys (so each index represents one key) and the values can be placed in the index of corresponding keys. Alternatively, the input may be constructed from key-value combinations which are then embedded. For example, if the key is 'eventid', 'eventid' may be tokenized or have a label, etc. which allows it to be input with the value tokenization inside the embedding. In many embodiments, embeddings may be used for data (e.g., JSON) generation and/or classification. Embeddings may be used to translate input into an n-dimensional space. Oftentimes this may be used to improve data separation. Modeling and/or analysis may then be done, such as regression, classification, generation, and the like.

Figure 2:
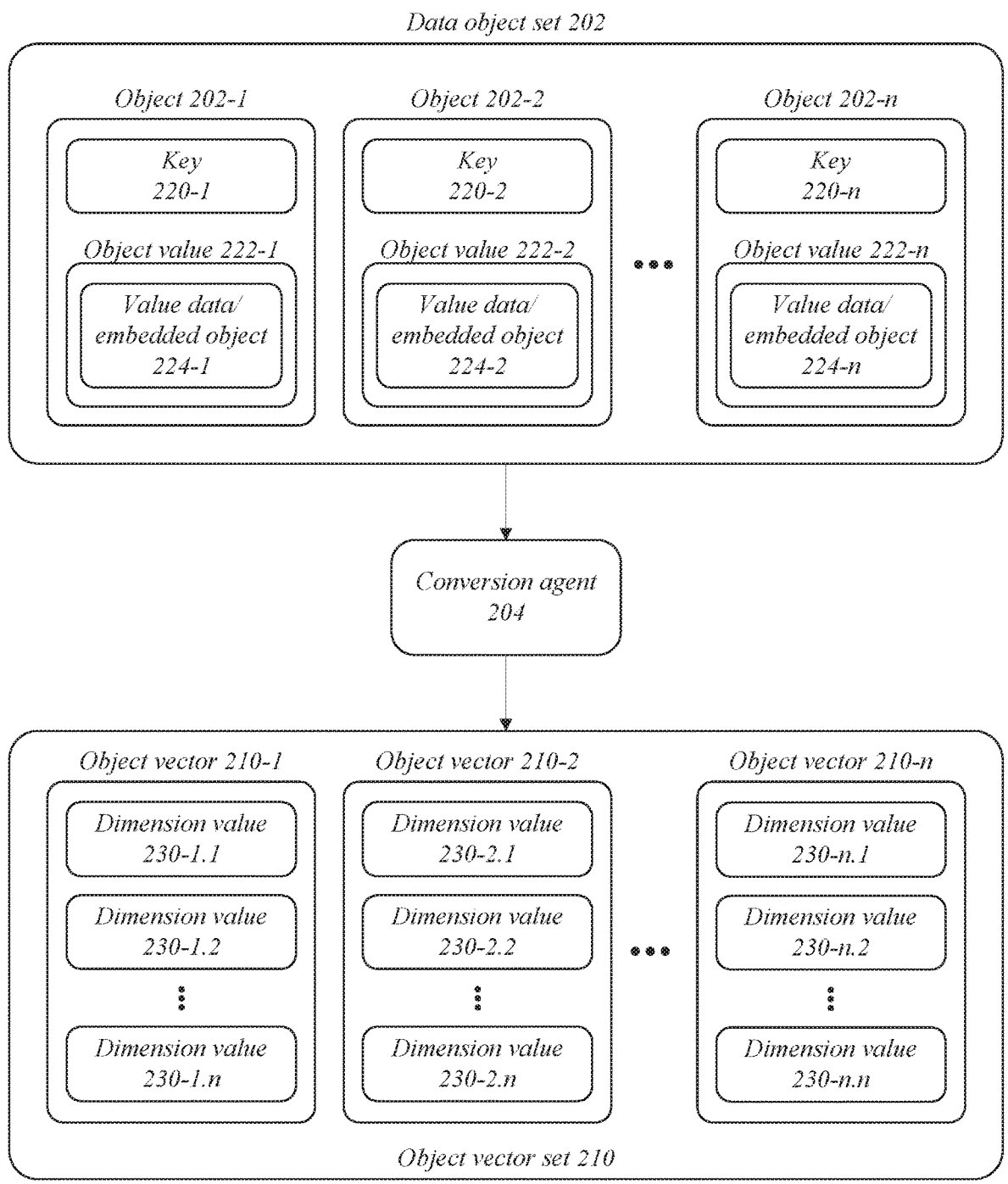
FIG. 2 illustrates an exemplary conversion agent for converting a data object set to an object vector set according to one or more embodiments described herein.

FIG. 2 illustrates an exemplary conversion agent 204 in environment 200 according to one or more embodiments described herein. In some embodiments, environment 200 may include one or more components that are the same or similar to one or more other components described herein. For example, conversion agent 204 may be the same or similar to conversion agent 104. Environment 200 may include data object set 202 with one or more data objects 202-1, 202-2, 202-n, conversion agent 204, and object vector set 210 with one or more object vectors 210-1, 210-2, 210-n. Each data object 202 may include a key 220 and an object value 222 comprising value data and/or one or more embedded objects 224. Each data object vector 210 may include a set of one or more dimension values 230. Embodiments are not limited in this context.

In many embodiments, conversion agent 204 may design/create a multidimensional embedding space for the data object set 202. In many such embodiments, conversion agent 204 may translate the data object set 202 into the multidimensional embedding space to produce object vector set 210. In one or more embodiments described herein, conversion agent 204 may determine an object vector for each data object in the set 202. For example, object 202-1 may correspond to object vector 210-1, object 202-2 may correspond to object vector 210-2, and object 202-n may correspond to object vector 210-n. In several embodiments, each object vector may include a dimension value corresponding to every dimension in the embedding space. Accordingly, dimension values 230-1.1, 230-2.1, 230-n.1 may comprise values that map onto a first dimension in the embedding space, dimension values 230-1.2, 230-2.2, 230-n.2 may comprise values that map onto a second dimension in the embedding space, and dimension values 230-1.n, 230-2.n, 230-n.n may comprise values that map onto an $n^{th}$ dimension in the embedding space.

Figure 3:
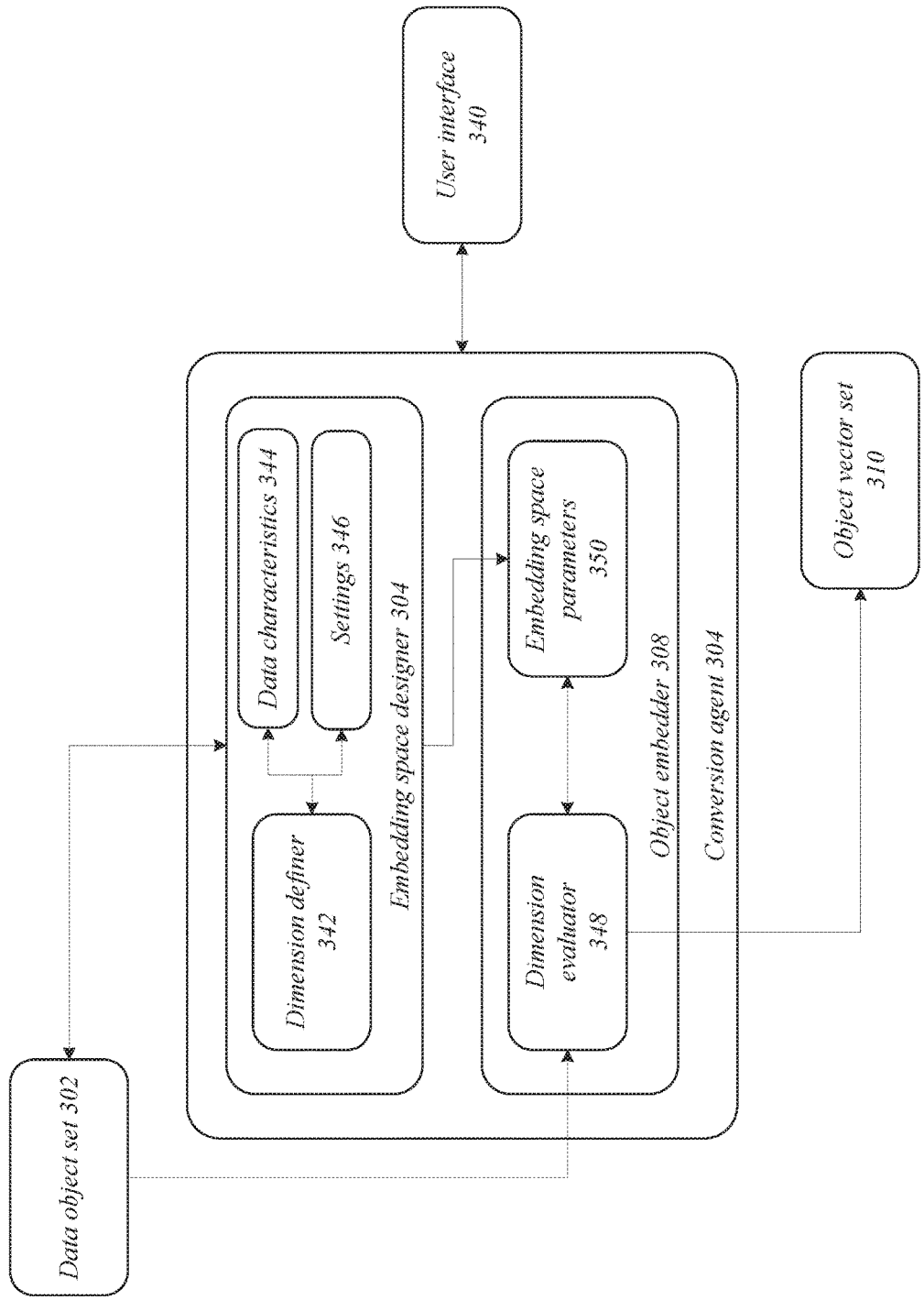
FIG. 3 illustrates various aspects of a conversion agent according to one or more embodiments described herein.

FIG. 3 illustrates various aspects of a conversion agent 304 in environment 300 according to one or more embodiments described herein. In some embodiments, environment 300 may include one or more components that are the same or similar to one or more other components described herein. For example, conversion agent 304 may be the same or similar to conversion agent 104. Environment 300 may include data object set 302, conversion agent 304, object vector set 310, and user interface 340. Conversion agent 304 may include embedding space designer 304 and object embedder 308. Embedding space designer 304 may include dimension definer 342, data characteristics 344, and settings 346. Object embedder 308 may include dimension evaluator 348 and embedding space parameters. In one or more embodiments described herein, conversion agent 304 may utilize data object set 302 and/or input received via user interface 340 to determine embedding space parameters 350. In many embodiments, conversion agent 304 may utilize data object set 302 and/or input received via user interface 340 to generate object vector set 310 based on embedding space parameters 350. Embodiments are not limited in this context.

In several embodiments, embedding space designer 304 may analyze data object set 302 to determine one or more data characteristics 344 of the data object set 302. In some embodiments, data characteristics 344 may include one or more of a set of possible keys, results of a statistical analysis, data types, depth of data objects, classifications, labels, possible values, ranges, and the like. For example, results of statistical analysis may include one or more of a distribution, variance, maximum value, minimum value, mean, median, mode, error, root mean square (RMS), moment, quantiles, and the like. In many embodiments, dimension definer 342 may determine embedding space parameters 350 based on data characteristics 344 and settings 346. In many such embodiments, one or more of the settings 346 may be determined based on input received via user interface 340. In various embodiments, settings 346 may include one or more properties of and/or preference for the embedding space defined by embedding space parameters 350. For instance, settings 346 may include a maximum or minimum number of dimensions in the embedding space. In another instance, settings 346 may dictate one or more dimensions in the embedding space. In yet another instance, settings 346 may indicate how to normalize values.

In various embodiments, dimension definer 342 may produce embedding space parameters 350 based on data characteristics 344 and/or settings 346. In many embodiments, the embedding space parameters 350 may define the multidimensional embedding space for translation of data object set 302. In many such embodiments, each object vector in object vector set 310 may include a point in the multidimensional embedding space. In some embodiments, embedding space parameters 350 may include metadata, such as regarding the embedding space and/or the data objects. In several embodiments, dimension evaluator 348 may determine an object vector in set 310 for each data object in set 302. In several such embodiments, each object vector may include a value for each dimension in the embedding space.

In some embodiments, user interface 340 may be used to initialize or initiate one or more operations of conversion agent 304. For example, embedding space parameters 350 may be generated in response to an operation initiated via user interface 340. In another example, translation of data object set 302 to object vector set 310 based on embedding space parameters 350 may be initiated via user interface 340. In various embodiments, user interface 340 may be utilized to review and/or confirm parameters. For instance, proposed embedding space parameters may be presented via the user interface 340 for review and/or confirmation.

Figure 4:
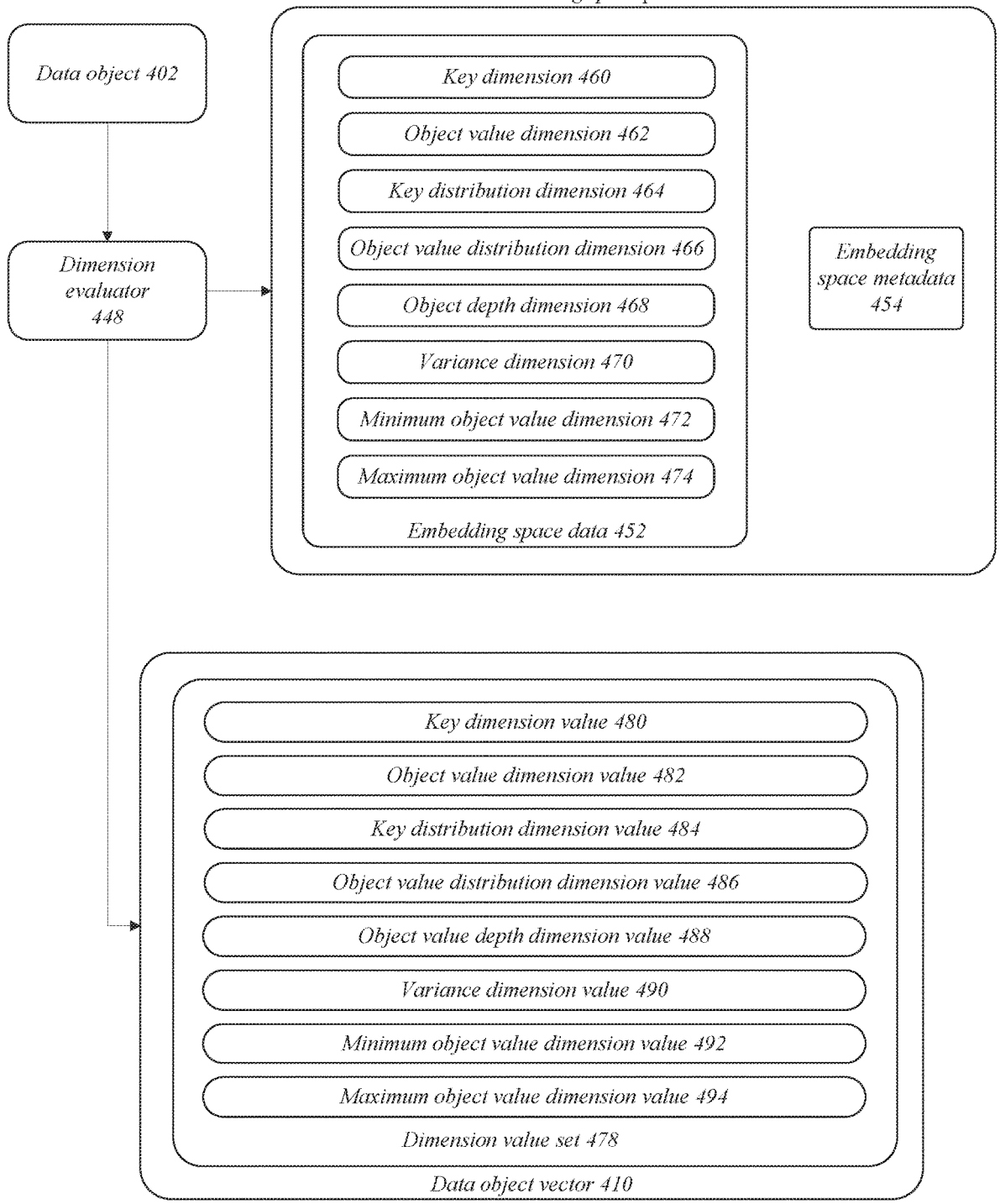
FIG. 4 illustrates various aspects of a dimension evaluator according to one or more embodiments described herein.

FIG. 4 illustrates various aspects of a dimension evaluator 448 in environment 400 according to one or more embodiments described herein. In some embodiments, environment 400 may include one or more components that are the same or similar to one or more other components described herein. For example, dimension evaluator 448 may be the same or similar to dimension evaluator 348. In another example, data object 402 may be the same or similar to object 202-1 and/or data object vector 410 may be the same or similar to object vector 210-1. Environment 400 may include data object 402, dimension evaluator 448, embedding space parameters 450, and data object vector 410. In one or more embodiments described herein, dimension evaluator 448 may convert data object 402 into data object vector 410 based on embedding space parameters 450. Embodiments are not limited in this context.

In the illustrated embodiment, embedding space parameters 450 may include embedding space data 452 and embedding space metadata 454. Further, data object vector 410 may include dimension value set 478. In various embodiments, embedding space data 452 may include indications of each dimension in the embedding space. In many embodiments, embedding space metadata 454 may include one or more indications associated with embedding space data 452. For example, embedding space metadata 454 may indicate a total number of dimensions or how to determine a value for a dimension.

In environment 400, embedding space data 452 may include key dimension 460, object value dimension 462, key distribution dimension 464, object value distribution dimension 466, object depth dimension 468, variance dimension 470, minimum object value dimension 472, and maximum object value dimension 474. Thus, embedding space parameters 450 may define an eight-dimension embedding space and a corresponding data object vector may include a value for each of the eight-dimensions. Accordingly, dimension evaluator 448 may produce data object vector 410 from data object 402 based on embedding space parameters 450, and the resulting dimension value set 478 for the data object vector 410 may include eight values with a key dimension value 480, an object value dimension value 482, a key distribution dimension value 484, an object value distribution dimension value 486, an object value depth dimension value 490, a minimum object value dimension value 492, and a maximum object value dimension value 494.

Figure 5A:

FIG. 5A illustrates one embodiment of a logic flow 500A, which may be representative of operations that may be executed in various embodiments in conjunction with techniques for creating and utilizing multidimensional embedding spaces, such as to condition sets of data objects for classification by a machine learning algorithm. The logic flow 500A may be representative of some or all of the operations that may be executed by one or more components/devices/environments described herein, such as conversion agent 104, embedding space designer 106, object embedder 108, and/or machine learning classifier 112. The embodiments are not limited in this context.

In the illustrated embodiments, logic flow 500A may begin at block 502. At block 502 "identify a set of data objects, each data object in the set of data objects comprising a key and an object value, wherein each object value comprises value data or an embedded object" a set of data objects may be identified. Further, each data object in the set of data objects may include a key and an object value, and each object value includes value data or an embedded object. For example, conversion agent 204 may identify the data object set 202 with objects 202-1, 202-2, 202-n. Proceeding to block 504 "analyze the set of data objects to determine one or more data characteristics of the set of data objects" the set of data objects may be analyzed to determine one or more data characteristics. For instance, embedding space designer 304 may analyze data object set 302 to determine data characteristics 344.

At block 506 "determine one or more embedding space parameters based on the one or more data characteristics of the set of data objects, wherein the one or more embedding space parameters define an embedding space comprising a plurality of dimensions" one or more embedding space parameters may be determined based on the one or more data characteristics of the set of data objects. Further, the one or more embedding space parameters may define an embedding space comprising a plurality of dimensions. For instance, one or more embedding space parameters 350 defining a multidimensional embedding space may be determined by embedding space designer 304 based, at least in part, on the data characteristics 344.

Continuing to block 508 "generate a set of object vectors, the set of object vectors comprising an object vector for each data object in the set of data objects, each object vector in the set of object vectors to include a set of dimension values and each dimension value in the set of dimension values to correspond to one of the plurality of dimensions in the embedding space, wherein a respective object vector for a respective data object is generated based on a respective key of the respective data object, a respective object value of the respective data object, and the one or more embedding space parameters" a set of object vectors comprising an object vector for each data object in the set of data objects may be generated. Further, each object vector in the set of object vectors may include a set of dimension values and each dimension value in the set of dimension values may correspond to one of the plurality of dimensions in the embedding space. Still further, a respective object vector for a respective data object may be generated based on a respective key of the respective data object, a respective object value of the respective data object, and the one or more embedding space parameters. For example, conversion agent 204 may generate object vector set 210 based on data object set 202. In such examples, each object in data object set 202 may include a key 220 and an object value 222 with either value data or an embedding object and each object vector in the object vector set 210 may include a set of dimensions 230-1, 230-2, 230-*n*. In a further example, object vector 210-1 may be generated based on key 220-1, the object value 222-1, and one or more embedding space parameters 350.

At block 510 "provide the set of object vectors as input to a machine learning algorithm" the set of object vectors may be provided as input to a machine learning algorithm. For instance, object vector set 110 may be provided as input to machine learning classifier 112. Continuing to block 512 "determine a classification of each data object in the set of data objects based on output of the machine learning algorithm in response to input of the set of object vectors" a classification of each data object in the set may be determined based on output of the machine learning algorithm in response to input of the set of object vectors. For example, a classification of each data object in set 102 may be determined based on output of the machine learning algorithm in response to input of the object vector set 110.

FIG. 5B illustrates one embodiment of a logic flow 500B, which may be representative of operations that may be executed in various embodiments in conjunction with techniques for creating and utilizing multidimensional embedding spaces, such as to condition sets of data objects for classification by a machine learning algorithm. The logic flow 500B may be representative of some or all of the operations that may be executed by one or more components/devices/environments described herein, such as conversion agent 104, embedding space designer 106, object embedder 108, and/or machine learning classifier 112. The embodiments are not limited in this context.

In the illustrated embodiments, logic flow 500B may begin at block 530. At block 530 "identify a set of data objects, each data object in the set of data objects comprising a key and an object value, wherein each object value comprises value data or an embedded object" a set of data objects may be identified. Further, each data object in the set of data objects may include a key and an object value, and each object value includes value data or an embedded object. For example, conversion agent 204 may identify the data object set 202 with objects 202-1, 202-2, 202-*n*. Proceeding to block 532 "analyze the set of data objects to determine one or more data characteristics of the set of data objects" the set of data objects may be analyzed to determine one or more data characteristics. For instance, embedding space designer 304 may analyze data object set 302 to determine data characteristics 344.

At block 534 "determine one or more embedding space parameters based on the one or more data characteristics of the set of data objects, wherein the one or more embedding space parameters define an embedding space comprising a plurality of dimensions" one or more embedding space parameters may be determined based on the one or more data characteristics of the set of data objects. Further, the one or more embedding space parameters may define an embedding space comprising a plurality of dimensions. For instance, one or more embedding space parameters 350 defining a multidimensional embedding space may be determined by embedding space designer 304 based, at least in part, on the data characteristics 344.

Proceeding to block 536 "identify a first data object in the set of data objects, the first data object comprising a first key and a first object value" a first data object comprising a first key and a first object value may be identified in the set of data objects. For instance, conversion agent 204 may identify object 202-2 comprising key 220-1 and object value 222-1.

Continuing to block 538 "generate a first object vector for the first data object in the set of data objects based on the first key, the first object value, and the one or more embedding space parameters, the first object vector including a first set of dimension values and each dimension value in the set of dimension values corresponds to one of the plurality of dimensions in the embedding space, wherein the first set of dimension values includes a first key dimension value that maps onto the key dimension, the first key dimension value determined based on the first key of the first data object" a first object vector for the first data object in the set may be generated based on the first key, the first object value, and the one or more embedding parameters. For example, object vector 410 may be generated for object 202-*n* based on key 220-*n*, object value 222-*n*, and embedding space parameters 450. Further, object vector 410 may include a dimension value set including a key dimension value 480.

At block 540 "provide the first object vector as input to a machine learning algorithm" the first object vector may be provided as input to a machine learning algorithm. For instance, object vector 210-2 may be provided as input to machine learning classifier 112. Continuing to block 542 "determine a classification of the first data object based on output of the machine learning algorithm in response to input of the set of object vectors" a classification of the first data object may be determined based on output of the machine learning algorithm in response to input of the first data object. For example, a classification of data object 202-*n* may be determined based on output of the machine learning classifier 112 in response to input of the object vector 210-*n*.

FIG. 5C illustrates one embodiment of a logic flow 500C, which may be representative of operations that may be executed in various embodiments in conjunction with techniques for creating and utilizing multidimensional embedding spaces, such as to condition sets of data objects for classification by a machine learning algorithm. The logic flow 500C may be representative of some or all of the operations that may be executed by one or more components/devices/environments described herein, such as conversion agent 104, embedding space designer 106, object embedder 108, and/or machine learning classifier 112. The embodiments are not limited in this context.

In the illustrated embodiments, logic flow 500C may begin at block 550. At block 550 "identifying a set of data objects, each data object in the set of data objects comprising a key and an object value, wherein each object value comprises value data or an embedded object" a set of data objects may be identified. Further, each data object in the set of data objects may include a key and an object value, and each object value includes value data or an embedded object. For example, conversion agent 204 may identify the data object set 202 with objects 202-1, 202-2, 202-*n*. Proceeding to block 552 "analyzing the set of data objects to determine one or more data characteristics of the set of data objects" the set of data objects may be analyzed to determine one or more data characteristics. For instance, embedding space designer 304 may analyze data object set 302 to determine data characteristics 344.

At block 554 "determining one or more embedding space parameters based on the one or more data characteristics of the set of data objects, wherein the one or more embedding space parameters define an embedding space comprising a plurality of dimensions" one or more embedding space parameters may be determined based on the one or more data characteristics of the set of data objects. Further, the one or more embedding space parameters may define an embedding space comprising a plurality of dimensions. For instance, one or more embedding space parameters 350 defining a multidimensional embedding space may be determined by embedding space designer 304 based, at least in part, on the data characteristics 344.

Proceeding to block 556 "identifying a first data object in the set of data objects, the first data object comprising a first key and a first object value" a first data object comprising a first key and a first object value may be identified in the set of data objects. For instance, conversion agent 204 may identify object 202-2 comprising key 220-1 and object value 222-1.

Continuing to block 558 "generating a first object vector for the first data object in the set of data objects based on the first key, the first object value, and the one or more embedding space parameters, wherein the first object vector includes a set of dimension values and each dimension value in the set of dimension values corresponds to one of the plurality of dimensions in the embedding space," a first object vector for the first data object in the set may be generated based on the first key, the first object value, and the one or more embedding parameters. For example, object vector 410 may be generated for object 202-*n* based on key 220-*n*, object value 222-*n*, and embedding space parameters 450. Further, object vector 410 may include a dimension value set including a key dimension value 480.

At block 560 "providing the first object vector as input to a machine learning algorithm" the first object vector may be provided as input to a machine learning algorithm. For instance, object vector 210-2 may be provided as input to machine learning classifier 112. Continuing to block 562 "determining a classification of the first data object based on output of the machine learning algorithm in response to input of the set of object vectors" a classification of the first data object may be determined based on output of the machine learning algorithm in response to input of the first data object. For example, a classification of data object 202-*n* may be determined based on output of the machine learning classifier 112 in response to input of the object vector 210-*n*.

Figure 6:
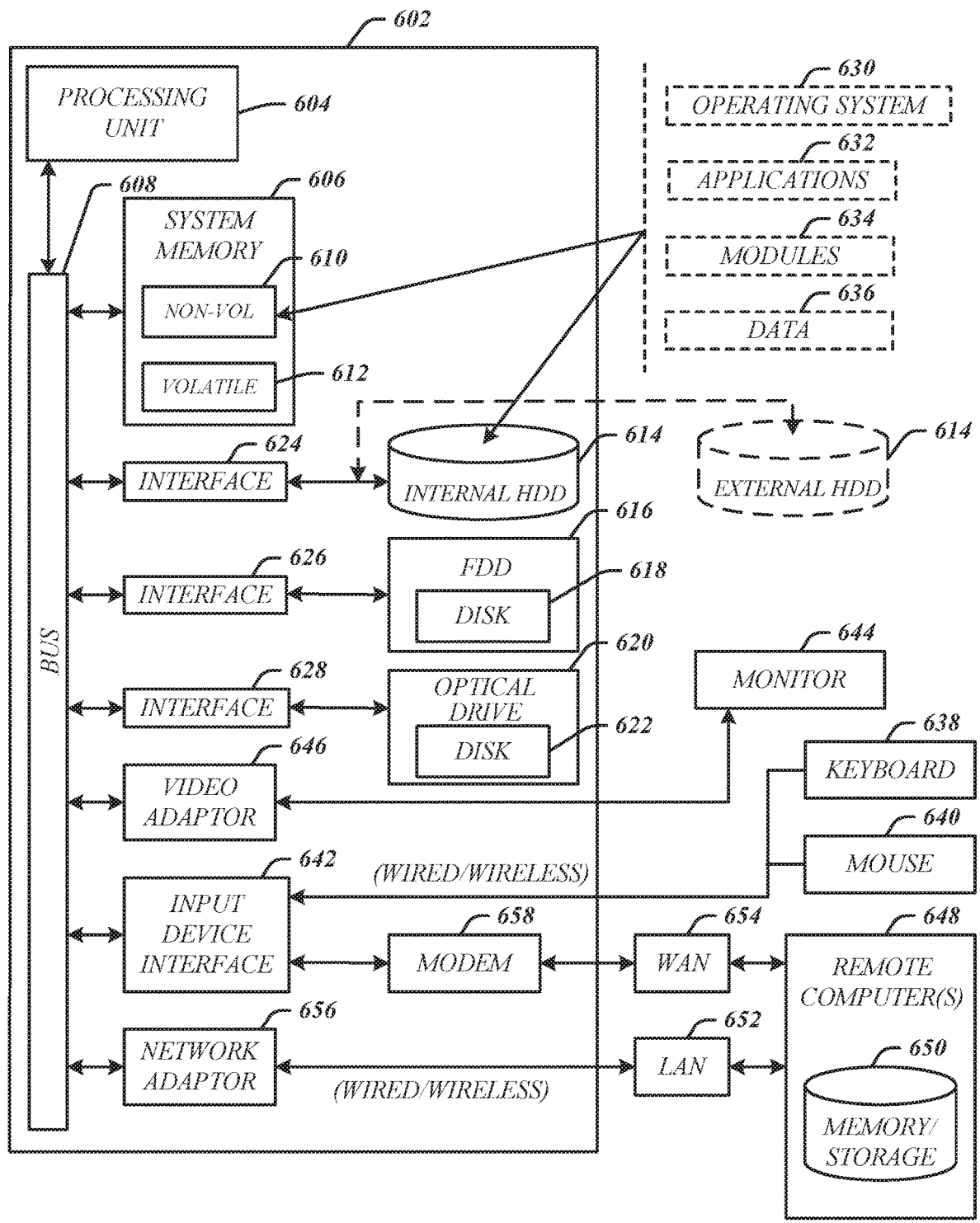
FIG. 6 illustrates exemplary aspects of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of one or more component described herein. In some embodiments, computing architecture 600 may be representative, for example, of a computing device that implements or utilizes one or more portions of components and/or techniques described herein, such as conversion agent 104, embedding space designer 106, object embedder 108, and/or machine learning classifier 112. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. In some embodiments, system memory 606 may include main memory. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include or implement, for example, the various techniques, applications, and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608 but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more migrations may occur via the networked environment. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
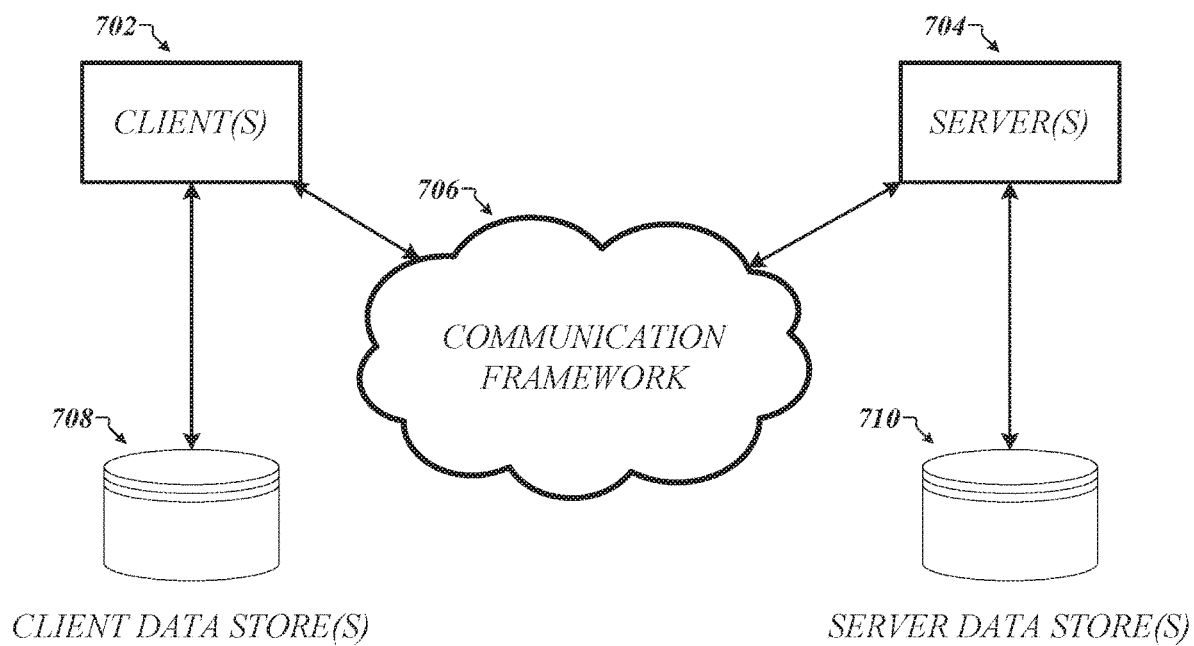
FIG. 7 illustrates exemplary aspects of a communications architecture according to one or more embodiments described herein.

FIG. 7 illustrates a block diagram of an exemplary communications architecture 700 suitable for implementing various embodiments as previously described, such as conversion agent 104, embedding space designer 106, object embedder 108, and/or machine learning classifier 112. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described herein. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. An apparatus, comprising:
   a processor; and
   memory comprising instructions that when executed by the processor cause the processor to:
   identify a set of data objects, each data object in the set of data objects comprising a key and an object value, wherein each object value comprises value data or an embedded object;
   analyze the set of data objects to determine one or more data characteristics of the set of data objects;

determine one or more embedding space parameters based on the one or more data characteristics of the set of data objects, wherein the one or more embedding space parameters define an embedding space to map one or more discrete variables to a vector of continuous numbers, the embedding space comprising a plurality of dimensions and one of the plurality of dimensions comprises an object depth dimension indicating a number of layers or embedded objects of a corresponding data object;

generate a set of object vectors, the set of object vectors comprising an object vector for each data object in the set of data objects, each object vector in the set of object vectors to include a set of dimension values and each dimension value in the set of dimension values to correspond to one of the plurality of dimensions in the embedding space, wherein a respective object vector for a respective data object is generated based on a respective key of the respective data object, a respective object value of the respective data object, and the one or more embedding space parameters;

provide the set of object vectors as input to a machine learning algorithm; and determine a classification of each data object in the set of data objects based on output of the machine learning algorithm in response to input of the set of object vectors.

2. The apparatus of claim 1, the set of data objects comprising a first data object including a first key and a first object value, the plurality of dimensions including a key dimension, and the memory comprising instructions that when executed by the processor cause the processor to determine a first key dimension value for the first data object based on the first key, wherein the first key dimension value maps onto the key dimension.

3. The apparatus of claim 1, the plurality of dimensions that define the embedding space comprising three or more of a key dimension, an object value dimension, a key distribution dimension, an object value distribution dimension, an object depth dimension, a variance dimension, a minimum object value dimension, and a maximum object value dimension.

4. The apparatus of claim 1, the set of data objects comprising a first data object including a first object value, the first object value comprising a first embedded data object including a first embedded object value, and the first embedded object value comprising a second embedded data object including a second embedded object value.

5. The apparatus of claim 4, the second embedded object value comprising embedded value data, and the memory comprising instructions that when executed by the processor cause the processor to determine an object depth dimension value for the first data object as three.

6. The apparatus of claim 1, the plurality of dimensions that define the embedding space comprising a variance dimension and the memory comprising instructions that when executed by the processor cause the processor to compute a variance value for each data object in the set of data objects, wherein the variance value for each data object in the set of data objects maps onto the variance dimension.

7. The apparatus of claim 1, the set of data objects comprising a set of JavaScript Object Notation (JSON) objects.

8. The apparatus of claim 7, at least one data object in the set of data objects comprising an embedded JSON object.

9. At least one non-transitory computer-readable medium comprising a set of instructions that, in response to being executed by a processor circuit, cause the processor circuit to:

identify a set of data objects, each data object in the set of data objects comprising a key and an object value, wherein each object value comprises value data or an embedded object;

analyze the set of data objects to determine one or more data characteristics of the set of data objects;

determine one or more embedding space parameters based on the one or more data characteristics of the set of data objects, wherein the one or more embedding space parameters define an embedding space to map one or more discrete variables to a vector of continuous numbers, the embedding space comprising a plurality of dimensions, the plurality of dimensions including a key dimension and an object depth dimension indicating a number of layers or embedded objects of a corresponding data object;

identify a first data object in the set of data objects, the first data object comprising a first key and a first object value;

generate a first object vector for the first data object in the set of data objects based on the first key, the first object value, and the one or more embedding space parameters, the first object vector including a first set of dimension values and each dimension value in the set of dimension values corresponds to one of the plurality of dimensions in the embedding space, wherein the first set of dimension values includes a first key dimension value that maps onto the key dimension, the first key dimension value determined based on the first key of the first data object;

provide the first object vector as input to a machine learning algorithm; and determine a classification of the first data object based on output of the machine learning algorithm in response to input of the first object vector.

10. The at least one non-transitory computer-readable medium of claim 9, the plurality of dimensions that define the embedding space comprising three or more of a key dimension, an object value dimension, a key distribution dimension, an object value distribution dimension, an object depth dimension, a variance dimension, a minimum object value dimension, and a maximum object value dimension.

11. The at least one non-transitory computer-readable medium of claim 9, the set of data objects comprising a second data object including a second object value, the second object value comprising a first embedded data object including a first embedded object value, and the first embedded object value comprising a second embedded data object including a second embedded object value.

12. The at least one non-transitory computer-readable medium of claim 11, the second embedded object value comprising embedded value data, and comprising instructions that, in response to being executed by the processor circuit, cause the processor circuit to determine an object depth dimension value for the second data object as three.

13. The at least one non-transitory computer-readable medium of claim 9, the plurality of dimensions that define the embedding space comprising a variance dimension and comprising instructions that, in response to being executed by the processor circuit, cause the processor circuit to compute a variance value for each data object in the set of data objects, wherein the variance value for each data object in the set of data objects maps onto the variance dimension.

14. The at least one non-transitory computer-readable medium of claim 9, the set of data objects comprising a set of JavaScript Object Notation (JSON) objects.

15. The at least one non-transitory computer-readable medium of claim 14, at least one data object in the set of data objects comprising an embedded JSON object.

16. A computer-implemented method, comprising:
identifying a set of data objects, each data object in the set of data objects comprising a key and an object value, wherein each object value comprises value data or an embedded object;
analyzing the set of data objects to determine one or more data characteristics of the set of data objects;
determining one or more embedding space parameters based on the one or more data characteristics of the set of data objects, wherein the one or more embedding space parameters define an embedding space to map one or more discrete variables to a vector of continuous numbers, the embedding space comprising a plurality of dimensions and one of the plurality of dimensions comprises an object depth dimension indicating a number of layers or embedded objects of a corresponding data object;
identifying a first data object in the set of data objects, the first data object comprising a first key and a first object value;
generating a first object vector for the first data object in the set of data objects based on the first key, the first object value, and the embedding space parameters, wherein the first object vector includes a set of dimension values and each dimension value in the set of dimension values corresponds to one of the plurality of dimensions in the embedding space;
providing the first object vector as input to a machine learning algorithm; and
determining a classification of the first data object based on output of the machine learning algorithm in response to input of the first object vector.

17. The computer-implemented method of claim 16, the plurality of dimensions including a key dimension, and comprising determining a first key dimension value for the first data object based on the first key, wherein the first key dimension value maps onto the key dimension.

18. The computer-implemented method of claim 16, the plurality of dimensions that define the embedding space comprising three or more of a key dimension, an object value dimension, a key distribution dimension, an object value distribution dimension, an object depth dimension, a variance dimension, a minimum object value dimension, and a maximum object value dimension.

19. The computer-implemented method of claim 16, the set of data objects comprising a second data object including a second object value, the second object value comprising a first embedded data object including a first embedded object value, and the first embedded object value comprising a second embedded data object including a second embedded object value.

20. The computer-implemented method of claim 19, the second embedded object value comprising embedded value data, and comprising determining an object depth dimension value for the second data object as three.

* * * * *